United States Patent [19]

Yasunaga et al.

[11] 3,975,228

[45] Aug. 17, 1976

[54] DRYING METHOD AND PLANT WHICH UTILIZE FLAME JET

[75] Inventors: Yoshikazu Yasunaga, Tokyo; Zenjiro Hokao, Tokorozawa; Koji Sakusabe, Tokyo; Yoshimitsu Tago, Kurume, all of Japan

[73] Assignee: Yasunaga Riken Co., Ltd., Tokyo, Japan

[22] Filed: Feb. 28, 1975

[21] Appl. No.: 553,988

[30] Foreign Application Priority Data

Dec. 13, 1974 Japan .......... 49-143616
July 22, 1974 Japan .......... 49-84445

[52] U.S. Cl. .......... 159/16 A; 432/159; 432/19; 110/8 C; 431/114

[51] Int. Cl.² .......... B01D 1/14; F27D 7/00

[58] Field of Search .......... 159/DIG. 3, 16 A, 47 WL; 110/8 C; 432/19, 86, 87, 159; 431/114

[56] References Cited

UNITED STATES PATENTS

| | | | |
|---|---|---|---|
| 2,468,455 | 4/1949 | Metziger | 159/16 A |
| 2,530,271 | 11/1950 | Swindin | 159/16 A |
| 2,631,084 | 3/1953 | Robinson | 159/16 A |
| 2,830,769 | 4/1958 | Work | 159/16 A |
| 3,309,262 | 3/1967 | Copeland et al. | 159/47 WL |
| 3,622,511 | 11/1971 | Pizzo | 159/16 A |
| 3,864,192 | 2/1975 | Copeland | 159/16 A |

*Primary Examiner*—John J. Camby
*Assistant Examiner*—Henry C. Yuen
*Attorney, Agent, or Firm*—Stevens, Davis, Miller & Mosher

[57] ABSTRACT

A drying plant utilizing a flame jet comprises a jet burner supporting device which is provided over a treatment tank, and a sound arresting device which is formed at a burner inserting port in the upper surface of the treatment tank. A jet burner drawn out of the treatment tank is inclined to bring the fore end of the burner close to an ignition device, thus to ignite the burner. While observing the ignited burner externally through a transparent tube, combustion is controlled to establish the perfect combustion. Loud noises at the adjustment of the combustion are prevented by the sound arresting device from being given forth to the outside. A matter to-be-dried, such as paper manufacture sludge, supplied into the treatment tank is crushed by flames of the jet burner at high temperature and at high speed without being burnt. The treated matter is taken out as the dried matter.

8 Claims, 7 Drawing Figures

DRYING METHOD AND PLANT WHICH UTILIZE FLAME JET

Figure 1:
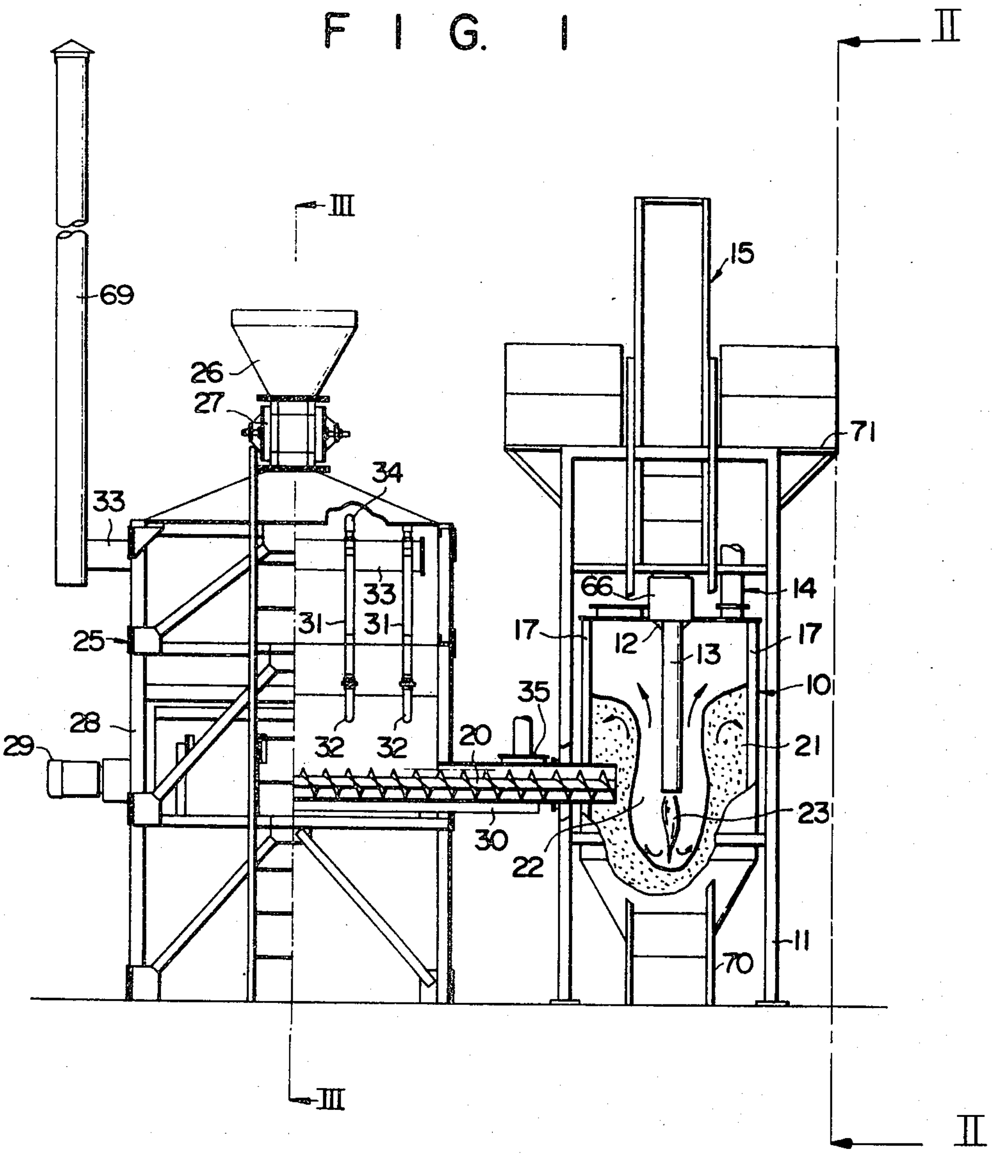

This invention relates to a method and a plant in which a solid matter with a high or low water content is dried and breaked by utilizing a flame jet at high temperature. More particularly, it relates to a drying method and plant which can eliminate noises at ignition of a flame jet.

When paper manufacture sludge is let to flow or is thrown away into the sea or mountains, the problem of pollution is unavoidable. It has therefore been attempted to dry and treat the sludge and to exploit the recovered fibrous materials etc. as building materials, packing materials etc. In case of drying the paper manufacture sludge, however, a large site area and high expenses of equipment and energy are required. There has recently been developed a treatment plant which dries the paper manufacture sludge and removes the water content by utilizing the high heat of a jet burner and which can efficiently take out the fibrous materials etc. The jet burner has a structure similar to that of U.S. Pat. No. 3,255,802 issued to J. A. Browning et al. It is a multiple pipe structure in which a feed tube for fuel such as gasoline and kerosene is arranged at the center of the interior, an air feed tube is arranged around the fuel feed tube, and a combustion chamber is formed at the fore end of the fuel feed tube and the air feed tube. Around the air feed tube and the combustion tube, a cooling jacket of the air cooling or liquid cooling system is formed. With the prior-art treatment plant utilizing the jet burner, the adjustments of the operation from the ignition of the jet burner to the perfect combustion are made outside a treatment tank. This is disadvantageous in involving danger. Moreover, impulse noises of about 130 phons arise before the normal running of the jet burner is reached. On account of the noise trouble, the operation cannot be smoothly carried forward in urban districts.

In accordance with this invention a jet burner is raised above a treatment tank by a machine control, it is inclined at the raised position so as to come close to an ignition device, and it is inserted into the treatment tank after the ignition. A bellows tube is disposed around the burner, while sound arresting means such as a transparent tube is disposed at a burner inserting port of the treatment tank. The burner immediately after the ignition is inserted under the state under which the bellows tube and the transparent tube are held in close contact. Thus, the combustion noises are prevented from leaking to the outside. While externally observing the combustion condition of the burner through the transparent tube, the supply of fuel and air is gradually increased. After the flames of the burner reach a combustion temperature and a jet speed as predetermined, the fore end of the burner is inserted more into the treatment tank. A matter with a high content of water is dried in this way.

The plant according to this invention dries and treats the matter to-be-dried with a high content of water by utilizing high heat owing to the jet burner. Also, the said plant can crush and dry solid matters with a low water content such as shells, corals, or calcium carbonate by means of a shock wave generated by an supersonic exhaust gas blown out of the jet burner. The jet burner is supplied with compressed air and such fuel as kerosene and gasoline at an air fuel ratio of 1.00 to 2.00, preferably 1.2 to 1.33, and is caused to generate jet flames which are maintained at a high temperature of 1500 to 2400°K and at high pressure and high speed (for example, at a jet pressure of about 6 kg/cm$^2$and at a supersonic jet speed of 1000 to 1300 m/sec). Thus, the matter to-be-dried is efficiently treated. By regulating the amounts of supply of air and fuel, a uniform drying treatment is carried out under an amount of heat generation controlled to the optimum. Further, since the jet combustion is possible in the water and it is of the supersonic speed flow, the water content is quickly vaporized by utilizing the fact that the heat transfer in the case of spouting the flames in the matter to-be-dried having the high water content is very great. Besides, the matter to-be-dried is crushed by the jet pressure and the impulse wave of the jet flames. In addition, by utilizing a sufficient kinetic energy owing to the jet pressure of the jet flames, the dried light matter is let to fly on the burnt gas, and the crushed matter subjected to the drying treatment is continously taken out from the treatment tank.

An object of this invention is to provide a drying plant with which the job from the ignition of a jet burner to the perfect combustion is free from any danger and which is easily operated.

Another object of this invention is to provide a drying plant in which sound arresting means is disposed at a burner inserting port of a treatment tank so as to prevent noises from leaking to the outside at the adjustment of the combustion of a burner.

Still another object of this invention is to provide a plant which can efficiently dry a matter with a high content of water by utilizing the high temperature of jet flames and the underwater combustion of a jet flow.

Still another object of this invention is to provide a plant which can efficiently crush and dry a solid matter with a low water content such as a shell, coral, or calcium carbonate, etc.

Yet another object of this invention is to provide a plant in which a dried light matter is let to fly on a burnt gas within a treatment tank and which can continuously deliver only the crushed and dried matter.

A further object of this invention is to provide a method in which a matter to-be-dried with a high content of water is efficiently dried while being crushed.

The above and other related objects and features of the invention will be apparent from a reading of the following description of the disclosure found in the accompanying drawings and the novelty thereof pointed out in the appended claims.

Figure 2:
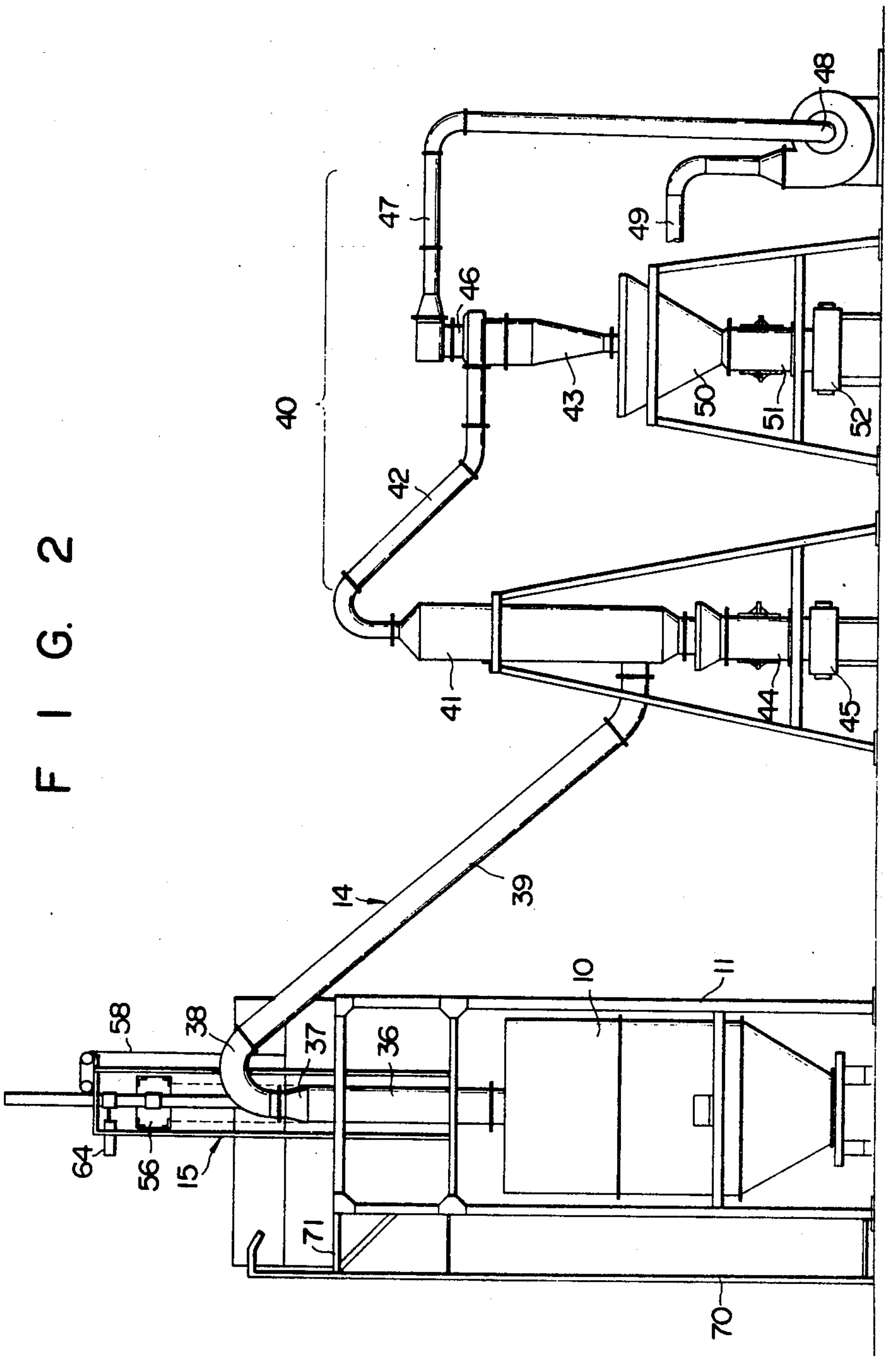
Figure 3:
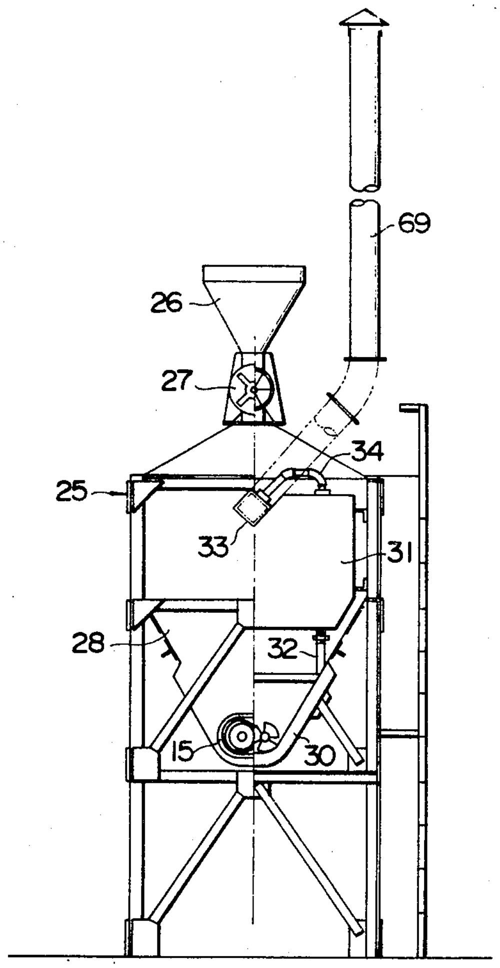
Figure 4:
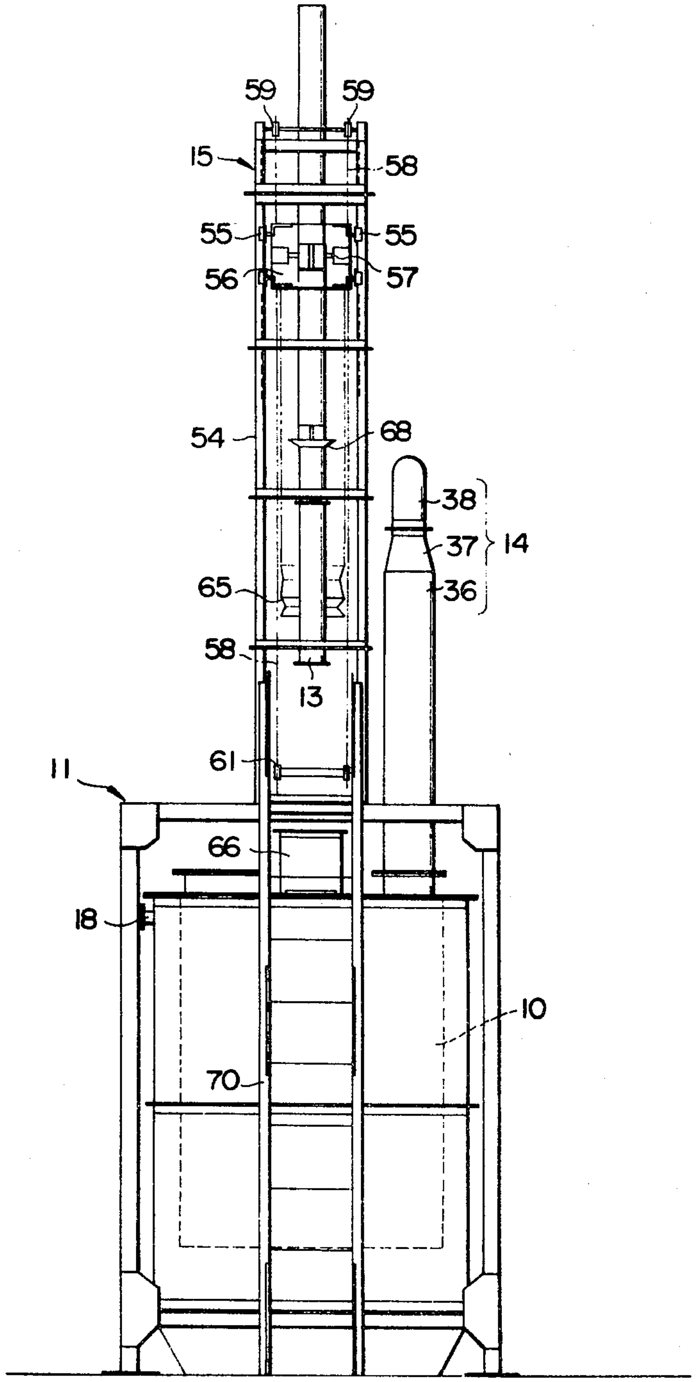
Figure 5:
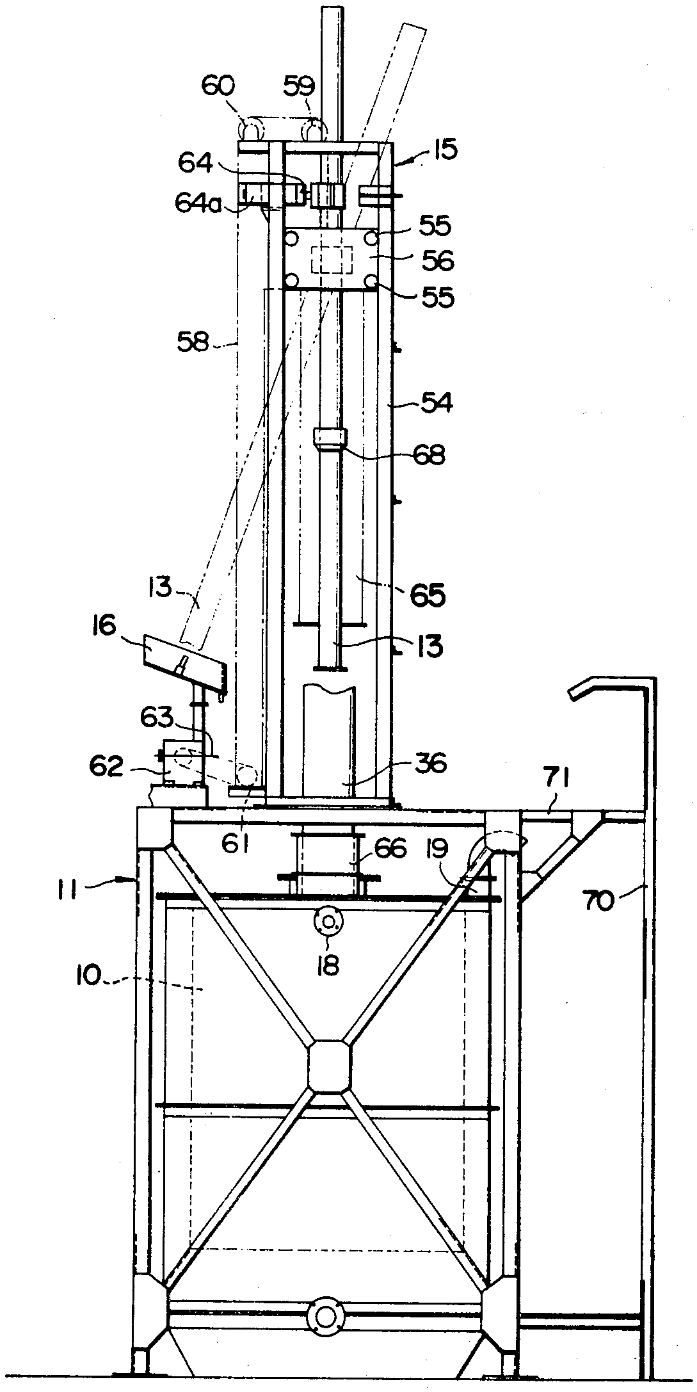
Figure 6:
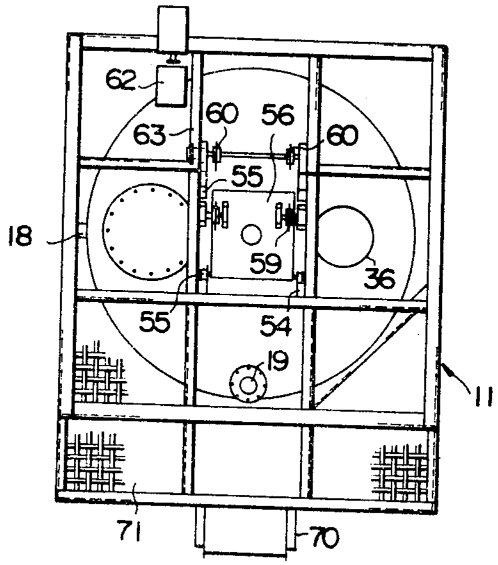
Figure 7:
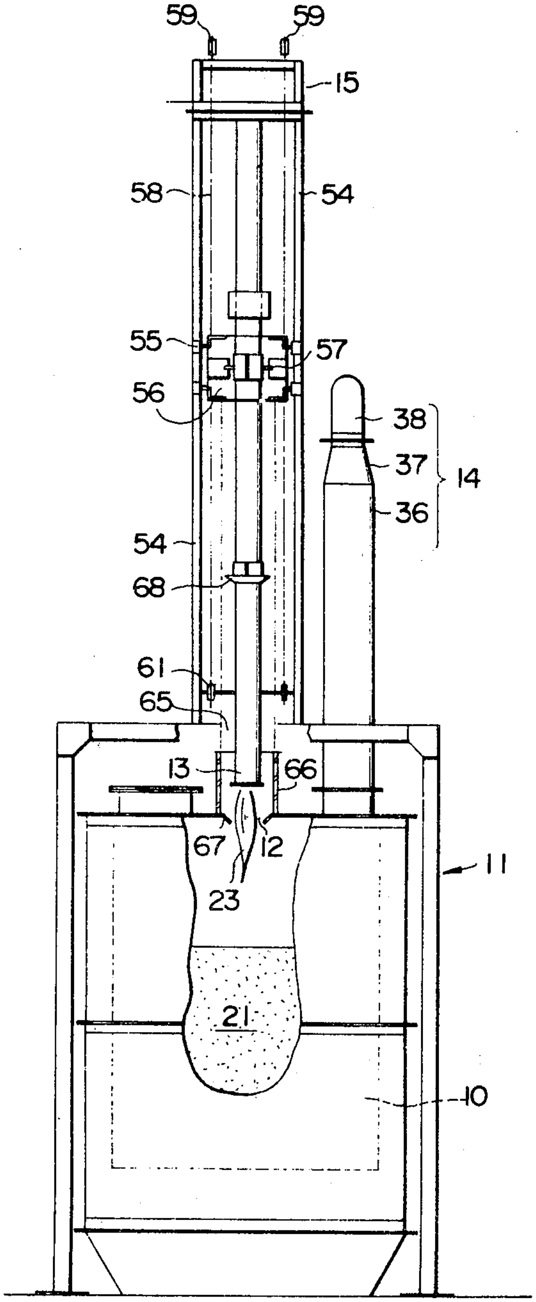

FIG. 1 is a partially broken front view of a drying plant embodying this invention, FIG. 2 is a side view taken along line II — II in FIG. 1, FIG. 3 is a partially broken side view taken along line III — III in FIG. 1, FIG. 4 is an enlarged front view of a burner supporting device in the state in which a jet burner is drawn up, FIG. 5 is a side view corresponding to FIG. 4, FIG. 6 is a plan view corresponding to FIG. 4, and FIG. 7 is an enlarged vertical section of the burner supporting device and vicinity in the state in which the jet burner is lowered down to an intermediate position.

The drying treatment plant includes as the principal constituents a treatment tank 10 in which flames at high temperature and at supersonic speed as emerge from a jet burner 13 are applied to a matter to-be-dried so as to dry and treat it, a feeder 20 which supplies the matter to-be-dried in a hopper assembly to the treatment tank 10, a jet burner supporting device 15 which is provided over the treatment tank 10, a duct 14 which is attached to the upper part of the treatment tank 10, and a collecting device 40 which is joined to the duct 14.

As shown in FIGS. 1 and 2, the treatment tank 10 is supported by a frame 11, the jet burner 13 is inserted from an inserting port 12 in the upper surface of the tank in a manner to face downwards, and the duct 14 for discharging the dried and treated matter and an exhaust gas out of the tank is mounted on the upper sideward part of the tank 10.

The supporting device 15 for the jet burner 13 is mounted above that part of the frame 11 which corresponds to substantially the central part of the treatment tank 10. An ignition device 16 is provided by the side of the supporting device 15.

The treatment tank 10 has a double structure consisting of inner and outer cylinders, between which a cooling jacket 17 is formed. The cooling jacket 17 prevents the temperature of the treatment tank from rising by supplying water from a feed port 18, circulating it inside the jacket and then discharging it from a drain port 19 as illustrated in FIGS. 4 and 5. The fore end of the feeder 20 for the matter to-be-dried is inserted and situated at substantially the middle part of the side wall of the treatment tank 10, while the jet burner 13 is inserted down beyond the middle of the central part of the tank interior. When the treatment tank 10 is charged with the matter to-be-dried 21 and the flames at high temperature and at high speed are downwardly spurted from the jet burner 13, a high heat region 22 is formed between the jet flames 23 and the layer of the matter to-be-dried 21 as shown in FIG. 1. A rapid agitation takes place owing to the jet pressure of the jet flames and the combustion exhaust gas. The stirring action proceeds within the hole-shaped high heat region 22 which is formed by the spurt of the jet flames 23. Herein, since a protective wall made up of the matter to-be-dried 21 is formed between the high heat region 22 and the wall surface of the treatment tank 10 and it prevents the thermal radiation to the exterior in cooperation with the cooling jacket 17, the thermal efficiency is held higher. Where the thermal efficiency lowers excessively, air or hot water is circulated through the jacket 17 instead of the cooling water, and the jacket is used for retaining heat so as to prevent the temperature in the treatment tank from falling.

The feeder 20 for the matter to-be-dried is attached to the hopper assembly 25 which is disposed by the side of the frame 11 for the treatment tank. The hopper assembly 25 is so constructed that a closed lower hopper 28 is arranged below an upper hopper 26 with a rotary valve 27 intervening therebetween. The feeder 20 is, for example, a screw conveyor in which two screws are juxtaposed in the longitudinal direction of the bottom of the lower hopper 28. The fore end part of the screw conveyor is inserted into the treatment tank 10 from the side wall thereof. As illustrated in FIG. 1, the feeder 20 is driven by a driving device 29 consisting of a motor and a reduction gear, and it supplies to the treatment tank 10 the matter to-be-dried 21 received in the hopper 28. A preheating jacket 30 is formed in a manner to extend from the outer wall of the feeder 20 to the bottom peripheral wall of the lower hopper 28. Further, several (four in the illustrated case) preheating partition walls 31 are provided within the lower hopper 28. A coupling pipe 32 is joined from the lower part of each partition wall 31 to the jacket 30, while a square tube 33 intersecting orthogonally with the partition walls 31 is provided in the middle of the upsides of the respective partition walls. Another coupling pipe 34 is joined between the upside of each partition wall and the square tube 33. One end of the square tube 33 is extended, led outside of the upper hopper 26, and coupled to a chimney 69. At a position of the feeder 20 close to the treatment tank 10, the jacket 30 is provided with an inlet 35 for introducing a hot gas (blower blast of a cyclone 43 to be stated later).

As shown in FIG. 2, the duct 14 erected on the treatment tank 10 is formed with a rise section 36 which keeps an identical diameter up to a predetermined height, and it is joined to a collector 41 of the collecting device 40 via a reduced section 37, a bent section 38 and a fall section 39. Above the collector 41 a duct 42 is provided and joined to the two-throw cyclone 43, while below the collector 41 a conveyor 45 is arranged through a rotary valve 44. A duct 47 from a central pipe 46 of the cyclone 43 is joined to the suction side of a blower 48, while a duct 49 on the discharge side of the blower 48 is led to the inlet 35 of the jacket 30. Arranged below the cyclone 43 are a hopper 50, a rotary valve 51 and a conveyor 52.

As shown in FIGS. 4 to 6 on an enlarged scale, the jet burner supporting device 15 has four rails 54 assembled on the frame 11 and has a slide device 56 with rollers 55 mounted inside the rails. A supporting shaft 57 is provided in the middle of the interior of the slide device 56, and it suspends the jet burner 13. FIGS. 4 and 5 illustrate the first state in which the jet burner is raised. When an air cylinder **64*a* is actuated under this state, the jet burner 13 can be turned clockwise and inclined by 20 to 30° as indicated by chain lines in FIG. 5. The ignition device 16** is provided at the position of the fore end of the burner inclined in this manner. Hereunder, the state in which the burner is inclined will be termed the second state.

An endless chain 58 for raising and lowering the jet burner is provided so as to stretch from above the slide device 56 to below it. The chain 58 is led from the upper end of the slide device 56, and is extended over sprocket wheels 59 and 60 disposed at the upper part of the rails 54. Further, it is led downwards and is extended over a sprocket wheel 61 close to the lower part of the rails. Still further, it is led upwards and is secured to the lower end of the slide device 56. A motor 62 for driving the chain is provided by the side of the ignition device 16. A chain for transmission 63 is extended between a shaft of the motor 62 and a shaft of the sprocket wheel 61. Reference numeral 70 in the drawings designates a ladder for job, and 71 a platform.

At the upper part of the rails 54, there is mounted a grasp device 64 which can grasp the upper part of the jet burner 13 upon the actuation of the air cylinder **64*a*. The lower part of the slide device 56 suspends a bellows tube 65 which covers almost the whole outer periphery of the jet burner 13 and whose upper end is closed tight. In correspondence with the bellows tube 65, a transparent tube 66 which is made of heat resisting glass, heat resisting plastics or the like and which serves as sound arresting means is provided around the burner inserting port 12 of the treatment tank. Under the state (the first state) under which the jet burner 13 is raised, the flexible tube 65 stretches. Under the state (the third state) under which the jet burner 13 is lowered to some extent as in FIG. 7, the lower end of the flexible tube 65 is in contact with the upper end of the transparent tube 66** so as to prevent the backward jet of the burner under burning from spouting to the exterior.

The jet burner 13 has a pressed contact seat 68 secured thereto. The pressed contact seat 68 has an inverted cone-shaped circumferential surface at a part which opposes to the inserting port 12 of the treatment tank 10 when the fore end part of the jet burner 13 occupies a predetermined position within the treatment tank 10. On the other hand, a conical receiving seat 67 is formed at the inserting port 12. Owing to the pressed contact between both the seats, the treatment tank 10 can be hermetically sealed under the state under which the jet burner is inserted.

Description will be made of the operation in the case of drying and treating the paper manufacture sludge by the use of the plant.

The overall drainage of a paper mill is subjected to the sludge activation. The activated sludge is dehydrated to a water content of 65 to 87% by the centrifugal separation. The paper manufacture sludge (the matter to-be-dried) thus obtained is thrown into the upper hopper 26 by a conveyor or a bucket crane. Every fixed amount of the matter to-be-dried is supplied while holding the closed state of the lower hopper 28 by the actuation of the rotary valve 27. It descends within the hopper 28 while being preheated by the jacket 30, and it is fed into the treatment tank 10 by the feeder 20.

The jet burner 13 has a multiple pipe structure in which a tube for supplying fuel such as gasoline and kerosene is arranged at the center of the interior, an air feed tube is arranged around the fuel feed tube, and a combustion chamber is formed at the fore end of the fuel feed tube and the air feed tube. If necessary, a cooling jacket for air or liquid cooling is formed around the air feed tube and the combustion chamber. Such internal construction is omitted from the illustration. In U.S. Pat. No. 3,255,802 referred to previously, the length of the jet flames is controlled by supplying oxygen and nitrogen. Since the jet burner in this invention need not control the length of the flames, the system of supplying oxygen and nitrogen individually is not adopted, and the supply of the combustion air suffices.

The air cooling system is employed in case of using gasoline as the fuel, while the liquid cooling system is employed in case of using kerosene. As previously stated, the air fuel ratio is 1.00 to 2.20, and the air fuel ratio of 1.2 to 1.33 in which the air : fuel is 3.3 $Nm^3$/min : 0.25 l/min to 5.8 $Nm^3$/min : 0.5 l/min is suitable.

After the treatment tank 10 is charged with a predetermined amount of the matter to-be-dried 21, the air cylinder 64*a* of the grasp device 64 is actuated under the state (the first state) under which the slide device 56 is stopped at the upper position of the supporting device 15. Then, the rod of the air cylinder is protruded to turn the jet burner 13 clockwise about the supporting shaft 57 as indicated by the chain lines in FIG. 5. Since the fore end of the burner advances to the ignition device 16 (the second state) by the turning, the burner can be ignited. After the ignition, the air cylinder 64*a* is restored to the original state, that is, the jet burner 13 is stood erect as indicated by solid lines in FIG. 5 (the first state). Under this state, the flexible tube 65 hangs down in such condition that it stretches and that it covers almost the whole outer periphery of the burner below the slide device 56 except the vicinity of the fore end.

Subsequently, the driving motor 62 is operated, the chain 58 is moved through the transmission member 63, and the jet burner 13 supported by the slide device 56 is caused to descend. The slide device 56 conducts the descending motion smoothly in such way that the rollers 55 arranged at the four corners are guided by the rails 54.

In the course of the descent, the slide device 56 is temporarily stopped at the position at which, as shown in FIG. 7, the fore end of the jet burner 13 lies halfway in the transparent tube 66 (the third state). Here, the amounts of supply of the fuel and air are gradually increased, and the perfect combustion is made under the predetermined air fuel ratio. At this time, the lower end of the flexible tube 65 is held in pressed contact with the upper end of the transparent tube 66. The ambient atmosphere of the flames 23 is accordingly shut off from the outside, so that the noises are satisfactorily suppressed. While the slide device 56 is kept stopped, the condition of the flames 23 of the jet burner 13 is observed through the transparent tube 66. After it is ascertained that the perfect combustion has been reached, the driving device 62 is operated again so as to lower the jet burner 13 and to insert its front and part into the layer of the matter to-be-dried 21 (the fourth state). When the burner is inserted into the matter to-be-dried 21, the bellows tube 65 contracts with its lower end held in contact with the upper end of the transparent tube 66. In this manner, the loud sound attendant upon the combustion of the jet burner 13 is cut off. In addition, the backward blast from the inserting port 12 is prevented from blowing out owing to the pressed contact between the conical receiving seat 67 at the inner edge of the inserting port and the pressed contact seat 68 of the jet burner 13.

While the flames of the jet burner 13 brought to the perfect combustion as described above are spurted towards the matter to-be-dried 21, the driving device 29 for the feeder 20 is actuated to supply the matter to-be-dried into the treatment tank 10. Then, the matter to-be-dried 21 close to the gas jet port of the burner is blown away, and the concave high heat region 22 is formed. Within the region 22, crushing owing to impulse waves of the jet flames 23 and rapid agitation owing to the jet pressure take place. Simultaneously therewith, water in the matter to-be-dried is quickly vaporized by the jet flames 23 at high temperature and at high speed. The matter to-be-treated is dried, and is discharged through the duct 14 by floating in an exhaust current which consists of the burnt gas, steam etc. and which is at high speed. The treated matter sufficiently crushed and dried to become light floats in the exhaust current, and flows from the rise section 36 of the duct 14 towards the bent section 38. In contrast, the matter which is comparatively heavy on account of insufficient crushing or insufficient drying falls inside the rise section 36, and it is subjected in the treatment tank 10 again to the drying and crushing actions owing to the high temperature and high pressure of the jet flames 23. The degree of drying can accordingly be adjusted by varying the height or sectional area of the rise section of the duct 14.

The dried matter advancing from the bent section 38 via the descent section 39 into the collector 41 has the greater part deposited and collected here. The remaining part flows through the duct 42 into the multicyclone 43 and is collected by it. Here, the dry steam flows into the central pipe 46 and is drawn by the blower 48. It advances through the duct 49 into the jacket 30 of the feeder 20 and is utilized for the preheating of the matter to-be-dried.

The parts of the dried matter collected at the lower parts of the collector 41 and the cyclone 43 fall down to the conveyors 45 and 52 by actuation of the rotary valves 44 and 51, respectively. They are transported to storage tanks (not shown) by the conveyors 45 and 52, respectively.

As the treatment of the matter to-be-dried proceeds, the matter to-be-dried in the treatment tank 10 decreases gradually. In this respect, the matter to-be-dried is continuously fed by the feeder 20 in dependence on the quantity of treatment so that a predetermined amount of the matter to-be-dried may always exist within the treatment tank 10. The quantity of supply can be variously changed by regulating the speed of revolution of the two screw conveyors.

When the drying treatment is to be stopped, the supply of the fuel and air is limited or ceased. The driving device 29 is rotated in the direction reverse to that in the foregoing case, to wind the chain 58 and to raise the slide device 56 into the first state. Thus, the jet burner 13 can be pulled out of the treatment tank 10 as illustrated in FIGS. 4 and 5.

An example of operation of the drying treatment plant will now be explained.

160 kg/hr of paper manufacture sludge with a water content of 65 to 87% was supplied to the treatment tank 10 which had an inside diameter of 1.3 m and a height of 1.7 m. The jet burner 13 was inserted from above the treatment tank 10. The jet burner 13 was fed with 3.2 $Nm^3$/min of compressed air under a pressure of 5.4 to 5.6 $kg/cm^2$and 0.24 to 0.25 l/min of gasoline under a pressure of 7.0 to 7.3 $kg/cm^2$. The normal running was reached 4 hours after the insertion of the burner, and the continuous running was possible since then.

Conditions at various parts in the continuous running were as follows:

| | |
|---|---|
| Compressed air: 50°C, 5.6 $kg/cm^2$, 3.2 $Nm^3$/min | |
| Gasoline: 7 $kg/cm^2$, 0.25 l/min | |
| Static pressure at inlet of collector: | +80 mm/Aq |
| Static pressure at inlet of blower: | +5 mm/Aq |
| Wind velocity in rise section of duct: | 4.9 m/sec |
| Temperatures at various parts: | |
| Inlet of rise section of duct: | 225°C |
| Inlet of collector: | 181°C |
| Inlet of cyclone: | 175°C |
| Lower part of cyclone: | 168°C |
| Outlet of cyclone: | 165°C |
| Inlet of blower: | 155°C |
| Outlet of blower: | 145°C |
| Amount of recovery of dried matter: | 24 kg/hr. |

The dried matter was fine cotton-like fibers which were very small in the bulk specific gravity. The fibers could be used as a cushion material, a packing material, etc.

The illustrated embodiment has been explained as employing the single burner. However, where the treatment capacity need be made large, a plurality of burners may be inserted into the treatment tank without increasing the capacity of the burner itself. On account of the behavior of the matter to-be-dried or the method of treating it or for any other reason, the burner may be obliquely or laterally inserted without being stood erect. Further, two or more ducts 14 may be disposed in dependence on the capacity of the exhaust current. Since the thermal efficiency will be lowered when drying and crushing a low-water containing matter, such as shells, coral or calcium carbonate, air or hot air may be introduced into the cooling jacket the treatment tank instead of introducing cooling water.

What we claim is:

1. A drying plant in which a flame jet burner is inserted into a treatment tank containing therein a matter to-be-dried, comprising:

a. a feeder which continuously supplies said matter to-be-dried into said treatment tank;

b. said treatment tank being provided on one side with said feeder for said matter to-be-dried, being provided on the other side with a duct for discharging the treated matter with the drying completed, and being provided in its upper surface with an inserting port for inserting said flame jet burner;

c. a jet burner supporting device which is provided over said treatment tank, and which includes endless chain drive means to support said jet burner in a manner to freely move it up and down and means to incline said jet burner at an ascent position thereof;

d. sound arresting means which consists of bellows provided around said jet burner and a transparent tube provided at said inserting port in said upper surface of said tank;

e. a burner ignition device which is provided at a sideward position on said upper surface of said treatment tank; and f. a collecting device which is joined to said duct in order to collect the dried and treated matter to be discharged through said duct to the outside.

2. The drying plant according to claim 1, wherein said bellows is a bellows tube while said transparent tube is a heat resisting one, and wherein when said jet burner is lowered down to an intermediate position of said treatment tank, the underside of said bellows tube and the upside of said transparent tube come into pressed contact to prevent noises from being given forth to the outside.

3. The drying plant according to claim 1, wherein said jet burner is supported by said supporting device with a flame jet port facing downwards.

4. The drying plant according to claim 1, wherein said treatment tank has a double structure of inner and outer cylinders, and an interspace between said cylinders is used as a cooling jacket.

5. The drying plant according to claim 1, wherein said duct comprises a rise section which has an identical diameter up to a predetermined height, a reduced section which adjoins to said rise section, and a descent section which is connected with a bent section and said collecting device.

6. The drying plant according to claim 1, wherein said supporting device comprises a slide device which is guided by four rails, and supporting shafts for suspending said jet burner as are provided inside said slide device, the burner inclining means being an air cylinder which inclines the burner body by pushing an upper part of said jet burner, said endless chain drive means being extended over said slide device.

7. The drying plant according to claim 1, wherein a pressed contact seat having an inverted cone-shaped periphery is secured to an intermediate position of said jet burner, while a conical receiving seat is formed at said burner inserting port of said treatment tank in correspondence with said pressed contact seat.

8. The drying plant according to claim 1, wherein said collecting device comprises a collector and a cyclone which adjoin to a descent section of said duct.

* * * * *